US012767154B2

(12) United States Patent
Nagata et al.

(10) Patent No.: US 12,767,154 B2
(45) Date of Patent: Oct. 20, 2026

(54) OPERATION MANAGEMENT APPARATUS

(71) Applicant: TOYOTA JIDOSHA KABUSHIKI KAISHA, Toyota (JP)

(72) Inventors: Yu Nagata, Chofu (JP); Ibuki Shimada, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 113 days.

(21) Appl. No.: 18/380,689

(22) Filed: Oct. 17, 2023

(65) Prior Publication Data

US 2024/0132087 A1 Apr. 25, 2024
US 2024/0227828 A9 Jul. 11, 2024

(30) Foreign Application Priority Data

Oct. 21, 2022 (JP) ................................. 2022-169482

(51) Int. Cl.

| | |
|---|---|
| ***B60W 50/029*** | (2012.01) |
| ***B60W 50/02*** | (2012.01) |
| ***B60W 60/00*** | (2020.01) |

(52) U.S. Cl.

CPC ...... *B60W 50/029* (2013.01); *B60W 50/0205* (2013.01); *B60W 60/0015* (2020.02); *B60W 2050/021* (2013.01); *B60W 2050/0292* (2013.01); *B60W 2540/049* (2020.02)

(58) Field of Classification Search

CPC ........... B60W 50/029; B60W 50/0205; B60W 60/0015; B60W 2050/021; B60W 2050/0292; B60W 2540/049; B60W 60/00186; B60W 50/035; B60W 50/14; B60W 2050/146

See application file for complete search history.

(56) References Cited

U.S. PATENT DOCUMENTS

| | | | | |
|---|---|---|---|---|
| 10,054,947 | B2 * | 8/2018 | Mays | B60T 7/18 |
| 11,237,555 | B1 * | 2/2022 | Chan | G01S 19/21 |
| 2011/0241862 | A1 * | 10/2011 | Debouk | B60W 50/035 340/439 |
| 2015/0051778 | A1 * | 2/2015 | Mueller | B60W 60/0051 701/29.2 |
| 2019/0300007 | A1 * | 10/2019 | Hilligardt | B60W 50/029 |
| 2020/0079394 | A1 * | 3/2020 | Masuda | B60R 21/00 |
| 2020/0160624 | A1 | 5/2020 | Yamashita et al. | |
| 2020/0406933 | A1 * | 12/2020 | Ide | B60W 60/0053 |
| 2021/0114600 | A1 * | 4/2021 | Uno | G06V 20/52 |

(Continued)

FOREIGN PATENT DOCUMENTS

| | | |
|---|---|---|
| JP | 2020-082918 A | 6/2020 |
| JP | 2021-009429 A | 1/2021 |

*Primary Examiner* — Christopher George Fees
(74) *Attorney, Agent, or Firm* — Dinsmore & Shohl LLP

(57) ABSTRACT

An operation management apparatus includes an interface configured to acquire first information identifying an abnormal state of an autonomous vehicle from an autonomous driving kit of the autonomous vehicle and acquire second information on the autonomous vehicle from an in-vehicle communication device of the autonomous vehicle, and a controller configured to change an operation pattern of the autonomous vehicle to an abnormality response pattern determined based on the first information and the second information and output the abnormality response pattern to the autonomous driving kit.

16 Claims, 3 Drawing Sheets

(56) References Cited

U.S. PATENT DOCUMENTS

| | | | | |
|---|---|---|---|---|
| 2021/0116917 | A1* | 4/2021 | Hirose | G08G 1/00 |
| 2021/0316742 | A1* | 10/2021 | Hayes | G05B 19/0428 |
| 2021/0331686 | A1* | 10/2021 | Beyers | B60W 60/0053 |
| 2022/0204005 | A1* | 6/2022 | Tsuji | B60W 10/20 |
| 2023/0176183 | A1* | 6/2023 | Sanberg et al. | B60N 2/0024 |
| 2023/0282043 | A1* | 9/2023 | Brunda | G07C 5/0816 701/31.4 |
| 2023/0311929 | A1* | 10/2023 | Laws | B60W 50/029 701/23 |
| 2023/0331243 | A1* | 10/2023 | White | B60W 60/0015 |
| 2024/0101087 | A1* | 3/2024 | Yuan | B60T 8/885 |

* cited by examiner

OPERATION MANAGEMENT APPARATUS

CROSS-REFERENCE TO RELATED APPLICATION

This application claims priority to Japanese Patent Application No. 2022-169482, filed on Oct. 21, 2022, the entire contents of which are incorporated herein by reference.

TECHNICAL FIELD

The present disclosure relates to an operation management apparatus for an autonomous vehicle.

BACKGROUND

Known autonomous vehicles operate autonomously according to an operation schedule provided by communication when communication is normal and to operate in a semi-autonomous mode with limited communication functions when a communication error occurs. For example, see Patent Literature (PTL) 1.

CITATION LIST

Patent Literature

PTL 1: JP 2021-009429 A

SUMMARY

Operators need to manage an autonomous vehicle when the autonomous vehicle operates in semi-autonomous mode in response to an abnormality.

It would be helpful to reduce the amount of work or the load for responding to abnormalities in autonomous vehicles.

An operation management apparatus according to an embodiment of the present disclosure includes an interface and a controller. The interface acquires first information identifying an abnormal state of an autonomous vehicle from an autonomous driving kit of the autonomous vehicle and acquires second information on the autonomous vehicle from an in-vehicle communication device of the autonomous vehicle. The controller changes an operation pattern of the autonomous vehicle to an abnormality response pattern determined based on the first information and the second information and outputs the abnormality response pattern to the autonomous driving kit.

According to the operation management system in an embodiment of the present disclosure, the amount of work or the load for responding to abnormalities in autonomous vehicles can be reduced.

DETAILED DESCRIPTION (Example Configuration of Operation Management System 1)

Figure 1:
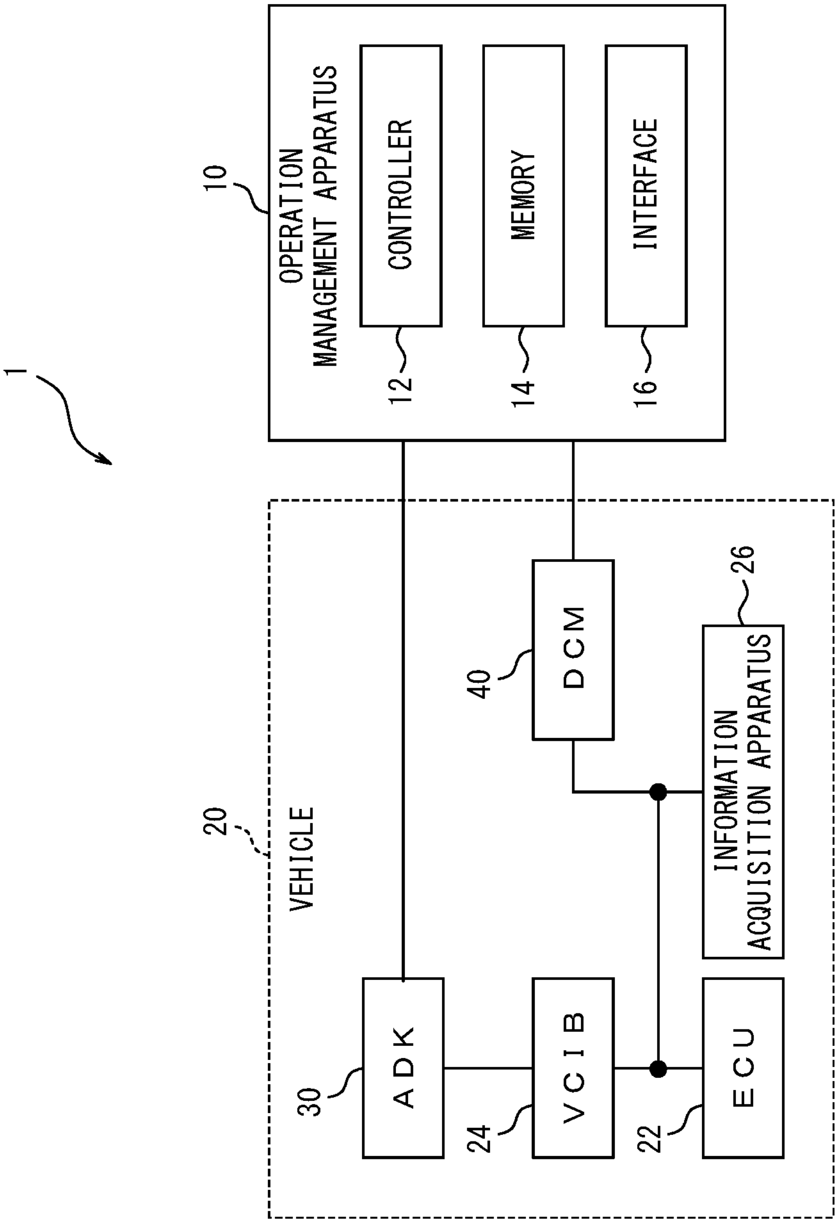
FIG. 1 is a block diagram illustrating a configuration example of an operation management system according to an embodiment.

As illustrated in FIG. 1, an operation management system 1 according to an embodiment includes an operation management apparatus 10 and a vehicle 20. The vehicle 20 operates by driving from stop to stop for users to board and alight at the stops, so that the users can travel. The users that board and travel on the vehicle 20 are also referred to as passengers. The operation management apparatus 10 determines the operation schedule, including the operation route of the vehicle 20 and the time at which the vehicle 20 arrives at or passes through each stop, and operates the vehicle 20 so that the vehicle can travel with passengers on board. An example configuration of the operation management system 1 will be described below.

<Operation Management Apparatus 10>

The operation management apparatus 10 includes a controller 12, a memory 14, and an interface 16.

The controller 12 controls the components of the operation management apparatus 10. The controller 12 may be configured to include at least one processor. The "processor" may include a general purpose processor, a dedicated processor specialized for specific processing, or the like in the present embodiment but is not limited to these. The controller 12 may be configured to include at least one dedicated circuit. The dedicated circuit may include, for example, a field-programmable gate array (FPGA) or an application specific integrated circuit (ASIC). The controller 12 may be configured with the dedicated circuit instead of the processor, or may be configured with the dedicated circuit along with the processor.

The memory 14 is configured to include a semiconductor memory, a magnetic memory, an optical memory, or the like, for example, but is not limited to these. The memory 14 may function as, for example, a main memory, an auxiliary memory, or a cache memory. The memory 14 may include an electromagnetic storage medium, such as a magnetic disk. The memory 14 may include a non-transitory computer readable medium. The memory 14 stores any information used for operation of the operation management apparatus 10. For example, the memory 14 may store a system program, an application program, or the like. At least a portion of the memory 14 may be included in the controller 12.

The interface 16 outputs information, data, or the like from the controller 12 to an external apparatus and inputs information, data, or the like from an external apparatus to the controller 12. The interface 16 may include a communication module configured to communicate with external apparatuses, such as the vehicle 20, via a network. The communication module may be, for example, compliant with a mobile communication standard, such as the 4th Generation (4G) standard or the 5th Generation (5G) standard. The communication module may be compliant with a communication standard, such as a Local Area Network (LAN). The communication module may be compliant with a wired or wireless communication standard. The communication module is not limited to these examples and may be compliant with various communication standards. The interface 16 may be configured to be capable of connecting to a communication module.

The interface 16 may be configured with an input device for accepting input of information, data, or the like from the user. The input device may be configured with, for example, a touch panel, a touch sensor, or a pointing device such as a mouse. The input device may be configured with a physical key. The input device may be configured with an audio input device, such as a microphone.

The interface 16 may be configured to include an output device that outputs information, data, or the like to the user. The output device may include, for example, a display device that outputs visual information, such as images, letters, or graphics. The display device may be configured with, for example, a Liquid Crystal Display (LCD), an organic or inorganic Electro-Luminescent (EL) display, a Plasma Display Panel (PDP), or the like. The display device is not limited to the above displays and may be configured with various other types of displays. The display device may be configured with a light emitting device, such as a Light Emitting Diode (LED) or a Laser Diode (LD). The display device may be configured with various other devices. The output device may include, for example, an audio output device, such as a speaker, that outputs audio information, such as voice. The output device is not limited to the above examples and may include various other devices.

The operation management apparatus 10 may include a single server apparatus or a plurality of server apparatuses capable of communicating with each other. The number of operation management apparatuses 10 included in the operation management system 1 is not limited to one and may be two or more.

<Vehicle 20>

The vehicle 20 managed by the operation management system 1 according to the present embodiment is assumed to be an autonomous vehicle that can run at least partially by autonomous driving. The autonomous driving level may, for example, be any one of Level 1 to Level 5 according to the level classification defined by the Society of Automotive Engineers (SAE). In the case of running by autonomous driving, the vehicle 20 may run based on the operation schedule outputted from the operation management apparatus 10. The vehicle 20 may be operated and driven by a driver or may be driven by remote control. In the case of being operated and driven by a driver or driven by remote control, the vehicle 20 may be operated based on the operation schedule outputted from the operation management apparatus 10.

The vehicle 20 includes an Electronic Control Unit (ECU) 22, a Vehicle Control Interface Box (VCIB) 24, an information acquisition apparatus 26, an Autonomous Driving Kit (ADK) 30, and a Data Communication Module (DCM) 40. The vehicle 20 further includes a drive apparatus, a braking apparatus, and a steering apparatus.

The ADK 30 is also referred to as an autonomous driving kit. The ADK runs the vehicle 20 according to the operation schedule for the vehicle 20 as determined by the operation management apparatus 10. The ADK 30 acquires information about the state of the vehicle 20 itself or information about the state of the surroundings of the vehicle 20 via the VCIB 24 from the ECU 22 or the information acquisition apparatus 26, as described below.

Based on the information about the state of the vehicle 20 itself or the state of the surroundings of the vehicle 20, the ADK 30 determines the speed or acceleration, or the direction of travel, of the vehicle 20 so that the vehicle can travel according to the operation schedule. The ADK 30 generates control information and outputs the control information to the ECU 22 to enable travel in the determined direction of travel at the determined speed or acceleration. For example, the ADK 30 generates control information to stop the vehicle 20 or change the direction of travel so as to avoid objects around the vehicle 20. The ADK 30 may also generate control information to continue running or to stop the vehicle 20 according to the state of the vehicle 20 in a case in which the vehicle 20 is in an abnormal state. The ADK 30 may generate control information to move the vehicle 20 to a predetermined position according to the state of the vehicle 20 in a case in which the vehicle 20 is in an abnormal state.

The ADK 30 may be communicably connected to the operation management apparatus 10 via a network. The ADK 30 may output at least a portion of the information acquired from the ECU 22 or the information acquisition apparatus 26 to the operation management apparatus 10. The information outputted from the ADK 30 to the operation management apparatus is also referred to as first information. The first information includes information identifying an abnormal state of the vehicle 20.

The ECU 22 controls the drive apparatus, the braking apparatus, and the steering apparatus of the vehicle 20 so that the vehicle 20 runs autonomously based on the control information from the ADK 30. The ECU 22 may be configured to include at least one processor. The ECU 22 may be configured to include at least one dedicated circuit. The ECU 22 may be configured to include either the dedicated circuit or the processor, or may be configured to include both the dedicated circuit and the processor.

The information acquisition apparatus 26 is configured to acquire various types of information, such as information about the state of the vehicle itself, or information about the state of the interior or surroundings of the vehicle 20. The information acquisition apparatus 26 outputs the acquired information to the VCIB 24 and the DCM 40.

The information acquisition apparatus 26 may include a positional information detection apparatus that detects the position of the vehicle 20 itself as the state of the vehicle 20. The positional information detection apparatus may be configured to include a receiver compliant with a satellite positioning system. The receiver compliant with the satellite positioning system may include, for example, a Global Positioning System (GPS) receiver. The information acquisition apparatus 26 may include a sensor that detects the speed or acceleration of the vehicle 20. The information acquisition apparatus 26 may include a sensor that detects the speed of an engine, motor, or the like of the vehicle 20. The information acquisition apparatus 26 may include a sensor that detects the temperature of each component of the vehicle 20. These examples are not limiting, and the information acquisition apparatus 26 may be configured to detect various states of the vehicle 20.

The information acquisition apparatus 26 may include an imaging apparatus such as a camera that captures images of the interior or surroundings of the vehicle 20. The information acquisition apparatus 26 may be configured to detect objects such as obstacles around the vehicle 20. The information acquisition apparatus 26 may be configured to detect the state of the road on which the vehicle 20 drives. The information acquisition apparatus 26 may be configured to detect the count (i.e., number) of passengers riding in the vehicle 20. The information acquisition apparatus 26 may be configured to detect the state of the passengers riding in the vehicle 20. These examples are not limiting, and the information acquisition apparatus 26 may be configured to acquire various information about the interior or surroundings of the vehicle 20.

The DCM 40 is also referred to as an in-vehicle communication device. The DCM 40 acquires information about the state of the vehicle 20 itself or information about the state of the surroundings of the vehicle 20 from the ECU 22 or the information acquisition apparatus 26. The DCM 40 may be communicably connected to the operation management apparatus 10 via a network. The DCM 40 outputs at least a portion of the information acquired from the ECU 22 or the information acquisition apparatus 26 to the operation management apparatus 10. The information outputted from the DCM 40 to the operation management apparatus 10 is also referred to as second information.

The VCIB 24 outputs the control information generated by the ADK 30 to the ECU 22. The VCIB 24 outputs at least a portion of the information acquired from the ECU 22 or the information acquisition apparatus 26 to the ADK 30.

The ADK 30 may be configured as a dedicated apparatus for the vehicle or may be configured as a general purpose apparatus that can be applied to various vehicles 20. Conversely, the vehicle 20 may be configured to run autonomously using control information from various ADKs 30. The VCIB 24 may be configured to connect to various ADKs 30 that can be installed in the vehicle 20.

The number of vehicles 20 included in the operation management system 1 is not limited to one and may be two or more.

(Operation Example of Operation Management System 1)

In the operation management system 1 according to the present embodiment, the controller 12 of the operation management apparatus 10 manages operation of the vehicle 20. In a case in which the state of the vehicle is good, the ADK 30 installed in the vehicle 20 generates control information based on the operation schedule so that the vehicle 20 travels through the stops for passengers to board and alight. In a case in which the state of the vehicle 20 is abnormal, the ADK 30 drives the vehicle 20 autonomously or stops the vehicle 20 at a predetermined position according to the state of the vehicle 20. Below, an example of operation in which an operation pattern of the vehicle 20 is changed according to the state of the vehicle 20 in the operation management system 1 is described.

<Determination of Abnormality Response Pattern Based on First Information>

The controller 12 acquires the first information from the ADK 30 using the interface 16. The controller 12 determines whether the state of the vehicle is normal or abnormal based on the first information. In a case in which the state of the vehicle 20 is determined to be normal based on the first information, the controller 12 outputs the operation pattern of the vehicle 20 to the ADK 30 as a normal pattern. The ADK 30 generates control information to run the vehicle 20 in the normal pattern designated by the controller 12.

In a case in which the state of the vehicle 20 is determined to be abnormal based on the first information, the controller 12 changes the operation pattern of the vehicle 20 to an abnormality response pattern. The abnormal state of the vehicle 20 includes a plurality of states. The controller 12 determines the abnormality response pattern corresponding to the abnormal state of the vehicle 20 and changes the operation pattern.

In the operation management system 1, in a case in which the VCIB 24 of the vehicle 20 is configured to be connectable to various ADKs 30, the information outputted from the VCIB 24 to the ADKs 30 is limited for reasons such as specifications or maintenance of confidentiality regarding the vehicle 20, for example. Therefore, the content of the first information outputted from the ADK 30 to the operation management apparatus 10 is limited.

The first information may identify the following four states, for example, as the state of the vehicle 20.

[0] state in which the vehicle 20 can run normally

[1] state in which the vehicle 20 can run but requires maintenance

[2] state in which the vehicle 20 should return to garage

[3] state in which the vehicle 20 should make an emergency stop

The states of the vehicle 20 identified by the first information are not limited to the four types described above and may instead be three types or fewer, or five types or more. The information identifying the abnormal state of the vehicle 20 is also referred to as an abnormal state signal. The first information is not limited to the abnormal state signal and may include various other signals and values of each signal.

The controller 12 of the operation management apparatus 10 can determine the state of the vehicle 20 based on the first information, which is limited information. With this configuration, the load for communication or processing can be reduced.

The first information is a limited representation of the state of the vehicle 20 and might not specifically identify the content of the abnormality occurring in the vehicle 20. The abnormality response pattern that matches the content of the abnormality in the vehicle 20 can differ for each content of the abnormality. For example, demand exists for differentiating between the abnormality response pattern in the case of an abnormality occurring in the drive apparatus of the vehicle 20 and the abnormality response pattern in the case of an abnormality occurring in the braking apparatus. Abnormality response patterns determined based on the first information, which cannot specifically identify the content of the abnormality, may not match the actual content of the abnormality in the vehicle 20.

<Updating of Abnormality Response Pattern Based on Second Information>

The content of the abnormality occurring in the vehicle 20 is specifically identified by the second information outputted from the DCM 40 of the vehicle 20. The controller 12 acquires the second information from the DCM 40 using the interface 16. The controller 12 can specifically identify the content of the abnormality occurring in the vehicle 20 based on the acquired second information.

The second information may identify the following items, for example, as the content of the abnormality in the vehicle 20.

(1) abnormal charge warning indication of battery and charging system (2) warning indication of (abnormality in) front airbag (3) warning indication of failure or malfunction in Electric Control Braking (ECB) system, or warning indication of failure in Electric Parking Brake (EPB) system (4) warning indication of brake fluid leakage (5) warning indication of brake system failure (6) warning indication of (abnormality in) antilock brake system (7) illumination of Parking Brake (PKB) lamp (8) warning indication of tire pressure (9) warning indication of Vehicle Stability Control (VSC) system failure

(10) information on pressing of emergency stop button

The items identified by the second information are not limited to the items types described above and may instead be 9 items or fewer, or 11 items or more.

For each of the above-described items, the second information may specify that there is no abnormality or that there is an abnormality. The second information may specify the degree of abnormality for at least some of the items. The second information may, for example, identify the degree of abnormality as a minor abnormality, a moderate abnormality, or a major abnormality. The second information may specify whether there is an abnormal operation state for at least some of the items. In the information on pressing of an emergency stop button, the second information may specify whether an emergency stop button was pressed in the cabin where the passengers ride, whether an emergency stop button was pressed in the driver's seat, or whether an emergency stop button installed outside the vehicle 20 was pressed.

The controller 12 determines whether the abnormality response pattern determined based on the first information matches the content of the abnormality identified by the second information. In a case in which the abnormality response pattern determined based on the first information matches the content of the abnormality identified by the second information, the controller 12 outputs the abnormality response pattern determined based on the first information as is to the ADK 30. In a case in which the abnormality response pattern determined based on the first information does not match the content of the abnormality identified by the second information, the controller 12 updates the abnormality response pattern based on the second information and outputs the updated abnormality response pattern to the ADK 30.

In the above-described examples of the first information and the second information, the controller 12 may determine an abnormality response pattern to stop the vehicle 20 on the spot in a case in which, based on the first information, the state of the vehicle 20 is identified as [3] the state in which an emergency stop should be made. The controller 12 may determine that the abnormality response pattern does not match the content of the abnormality in a case in which, based on the second information, the content of the abnormality is identified as a major abnormality in (2), the warning indication of the front airbag. The controller 12 may determine that there is no problem with the vehicle 20 running and no need to stop the vehicle 20 on the spot, and may update the abnormality response pattern to send the vehicle 20 to the garage.

The controller 12 may determine that the abnormality response pattern does not match the content of the abnormality in a case in which, based on the second information, the content of the abnormality is identified as a major abnormality in (10), the information on pressing of the emergency stop button. The controller 12 may determine that there is no problem with the vehicle 20 running and no need to stop the vehicle 20 on the spot, and may update the abnormality response pattern to send the vehicle 20 to the garage.

The controller 12 may determine that the abnormality response pattern does not match the content of the abnormality in a case in which, based on the second information, the content of the abnormality is identified as pressing of the emergency stop button in (10), the information on pressing of the emergency stop button. The controller 12 may determine that there is no problem with the vehicle 20 running and no need to stop the vehicle 20 on the spot, and may update the abnormality response pattern to send the vehicle 20 to the garage.

As described above, the controller 12 may update the abnormality response pattern to match the content of the abnormality in a case in which the abnormality response pattern determined based on the first information does not match the content of the abnormality. It suffices for the controller 12 to acquire the second information that identifies the specific content of the abnormality and to determine the content of the abnormality in the vehicle 20 only in a case in which the state of the vehicle 20 is determined to be abnormal based on the limited first information. By the second information being temporarily acquired and the content of the abnormality being determined, the communication or processing load can be reduced as compared to a case in which the second information is acquired and the content of the abnormality is determined continuously. Even in a case in which the state of the vehicle 20 is determined, in the determination based on the first information, to be [3] the state in which an emergency stop should be made, the controller 12 can update the abnormality response pattern to send vehicle 20 to the garage based on the second information. This eliminates the need to dispatch personnel to the site where the vehicle 20 performed an emergency stop. As a result, the amount of work or the load for responding to abnormalities in the vehicle 20 can be reduced. Automation of the abnormality response can also be encouraged.

The controller 12 may determine that the abnormality response pattern does not match the content of the abnormality in a case in which the content of the abnormality satisfies a predetermined condition. The predetermined condition may, for example, include that the state of the vehicle 20 identified by the first information is [3], the state in which an emergency stop should be made, as described above, and that the content of the abnormality identified by the second information is a major abnormality in an item that does not immediately affect the running of the vehicle 20. The content of the abnormality may be divided between first items that affect the driving, steering, and braking of the vehicle 20, and second items that do not affect the driving, steering, and braking of the vehicle 20 but affect the safety of the vehicle 20. The controller 12 may set a predetermined condition stipulating that the content of the abnormality correspond to a second item. These examples are not limiting, and the controller 12 may set the predetermined condition in various ways.

The ADK 30 of the vehicle 20 generates control information to run the vehicle 20 in the abnormality response pattern acquired from the controller 12. The vehicle 20 is sent to the garage or performs an emergency stop on the spot according to the abnormality response pattern.

Summary

As described above, the controller 12 of the operation management apparatus 10 according to the present embodiment determines the abnormality response pattern based on the first information from the ADK 30 and determines whether the abnormality response pattern matches the content of the abnormality based on the second information from the DCM 40. In other words, the controller 12 identifies the content of the abnormality occurring in the vehicle 20 based on the second information in a case in which the state of the vehicle 20 is determined to be abnormal based on the first information. With this configuration, the load for communication or processing can be reduced. The controller 12 updates the abnormality response pattern in a case in which the abnormality response pattern does not match the content of the abnormality. In this way, the amount of work or the load for responding to abnormalities in autonomous vehicles can be reduced. Automation of the abnormality response can also be encouraged.

In other words, the controller 12 of the operation management apparatus 10 changes the operation pattern of the vehicle 20 to an abnormality response pattern determined based on the first information and the second information and outputs the abnormality response pattern to the ADK 30.

As a comparative example, a system is considered in which an emergency stop, suspension of operation, or the like is determined based solely on an abnormal state signal while an autonomous vehicle is running autonomously. In a case in which an emergency stop or suspension of operation is determined while an autonomous vehicle is running autonomously, it is difficult for the autonomous vehicle to resume operation by itself. In this case, the operation manager of the autonomous vehicle needs to make the determination to resume operation. For example, in a case in which the operation manager confirms the abnormal state signal of the autonomous vehicle, the operation manager confirms the content of the abnormality in the autonomous vehicle and determines whether to suspend or resume operation. The operation manager makes the determination after confirming whether there are passengers. The operation manager gives specific instructions to the autonomous driving kit of the autonomous vehicle on how to respond to the abnormality. Furthermore, the operation schedule needs to be changed manually based on the result of the determination. This causes passengers to wait until operation resumes. As a result, the service performance or convenience for passengers is reduced. The workload for the operation manager or worker also increases. Furthermore, the safety of the autonomous vehicle itself or of the surroundings of the autonomous vehicle is reduced by the fact that the response of the autonomous vehicle is not determined until the operation is resumed or the operation schedule is changed. By updating the abnormality response pattern based on the second information, as described above, when an abnormality occurs in an autonomous vehicle, the operation management apparatus 10 in the present embodiment can reduce the frequency with which the autonomous vehicle stops as compared to the system in the comparative example. The service performance or convenience for passengers is therefore improved. The workload for the operation manager or worker can also be reduced. Furthermore, the safety of the autonomous vehicle can be maintained.

<Abnormality Response Matrix>

The controller 12 of the operation management apparatus 10 may use an abnormality response matrix in which abnormality response patterns and abnormal states identified by the first information are associated to determine the abnormality response pattern corresponding to the abnormal state of the vehicle 20 as identified by the first information. In other words, the controller 12 may determine the abnormality response pattern corresponding to an abnormal state based on the abnormality response matrix and change the operation pattern.

The abnormality response matrix may be configured as a table that associates an abnormality response pattern with each of the states [1] to [3] of the vehicle 20 identified by the first information. In the abnormality response matrix, for example, an abnormality response pattern indicating to continue operation of the vehicle 20 may be associated with [1] the state in which the vehicle 20 requires maintenance. An abnormality response pattern indicating to send the vehicle 20 to the garage may be associated with [2] the state in which the vehicle 20 should return to the garage. An abnormality response pattern indicating to stop the vehicle 20 on the spot and notify personnel to rush to the scene may be associated with [3] the state in which the vehicle 20 should make an emergency stop.

The controller 12 can easily determine the abnormality response pattern by using the abnormality response matrix. As a result, the processing load can be reduced.

<Determination of Abnormality Response Pattern Based on Presence of Passengers or Count of Passengers in Vehicle 20>

The information acquisition apparatus 26 of the vehicle 20 may detect a count of passengers in the vehicle 20. The information acquisition apparatus 26 may output information about the passengers to the DCM 40. The DCM 40 may output information about the passengers to the operation management apparatus 10 as the second information. The controller 12 of the operation management apparatus 10 may acquire information about the passengers of the vehicle 20 as the second information.

Figure 2:
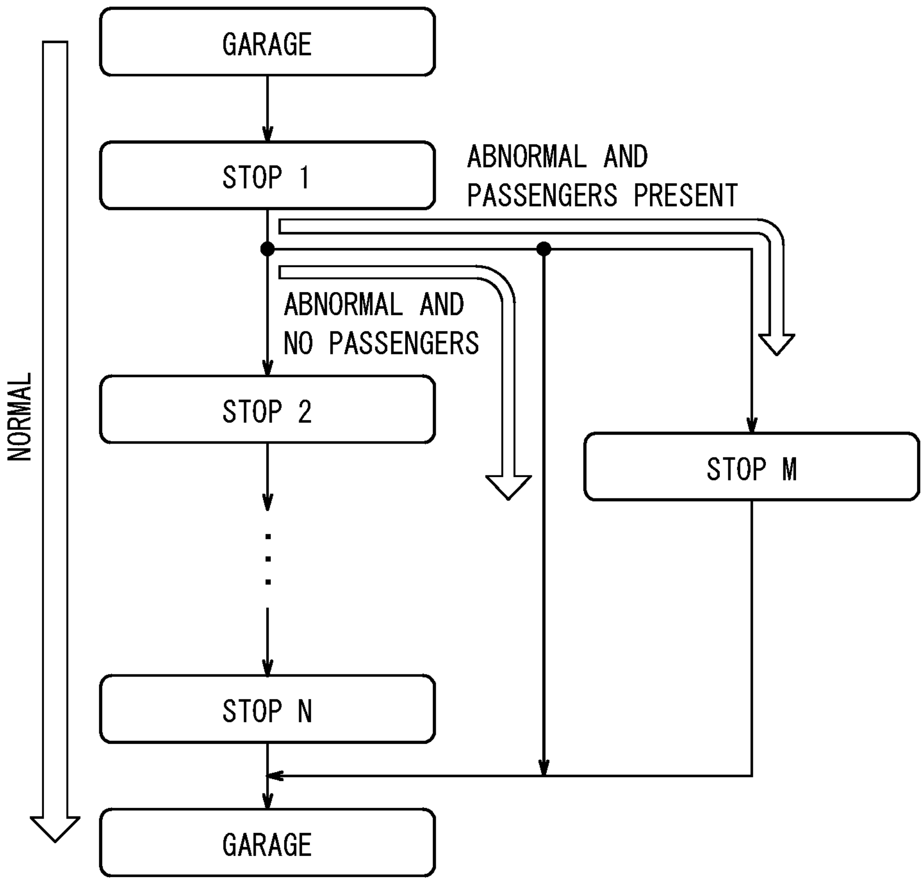
FIG. 2 is a diagram illustrating an example operation route of a vehicle.

For example, as illustrated in FIG. 2, assume that the vehicle 20 departs from the garage, travels in the order of stop 1, stop 2, . . . , and stop N, and returns to the garage as a normal operation schedule. Here, assume that while the vehicle 20 is traveling between the first and second stops, the state of the vehicle 20 becomes [2] the state in which the vehicle 20 should return to the garage. The controller 12 may differentiate between abnormality response patterns for the vehicle 20 for a case in which a passenger is riding in the vehicle 20 and a case in which no passenger is riding. The controller 12 may determine that a passenger is riding in the vehicle 20 in a case in which the count of passengers is one or more. The controller 12 may determine that no passenger is riding in the vehicle 20 in a case in which the count of passengers is zero.

In a case in which no passenger is riding in the vehicle 20, the controller 12 may determine an abnormality response pattern for the vehicle to travel a route ("abnormal" and "no passengers" in FIG. 2) back to the garage regardless of the position of the stop. In this case, there may or may not be a stop on the route that the vehicle 20 travels to return to the garage. The controller 12 may determine an abnormality response pattern for the vehicle to return to the garage by the shortest route or the fastest route. The operation efficiency of the vehicle 20 is thereby improved.

In a case in which a passenger is riding in the vehicle 20, the controller 12 may determine an abnormality response pattern for the vehicle 20 to travel a route ("abnormal" and "passengers present" in FIG. 2) back to the garage via at least one stop (for example, stop M in FIG. 2). The controller 12 may determine an abnormality response pattern such that at least one stop from stop 1 to stop N is located on the route that the vehicle 20 travels to return to the garage. Stop M in FIG. 2 may be a stop that is included in the normal operation route of the vehicle 20 or may be a stop that is included in another route. The controller 12 may determine an abnormality response pattern for passengers to alight at the stop through which the vehicle 20 is routed. The controller 12 may determine the stop at which the passengers are to alight so that the passengers alighting from the vehicle 20 in which the abnormality occurred can transfer quickly to another vehicle 20. The controller 12 may also determine an operation schedule to move another vehicle 20 to the stop at which the passengers are to alight. The convenience for passengers is thereby improved.

The controller 12 may differentiate between abnormality response patterns for the vehicle 20 based on the count of passengers in the vehicle 20. The controller 12 may differentiate between the positions of stops through which the vehicle 20 is routed to return to the garage for a case in which the count of passengers is less than a predetermined number and a case in which the count of passengers is equal to or greater than a predetermined number. The controller 12 may also differentiate between the number of stops through which the vehicle 20 is routed for a case in which the count of passengers is less than a predetermined number and a case in which the count of passengers is equal to or greater than a predetermined number. The controller 12 may determine the stop at which the passengers are to alight so that the passengers alighting from the vehicle 20 in which the abnormality occurred can transfer quickly to another vehicle 20. The controller 12 may also determine the stop at which the passengers are to alight so that the passengers can alight safely from the vehicle in which the abnormality occurred. For example, the controller 12 may determine that as the count of passengers is higher, a stop located in a larger area where passengers can wait is determined as the stop at which passengers are to alight. The convenience for passengers is thereby improved.

As described above, the controller 12 may differentiate, based on the count of passengers in the vehicle 20, between an abnormality response pattern for a case in which there is a passenger in the vehicle 20 and an abnormality response pattern for a case in which no passenger is in the vehicle 20. The controller 12 may also determine the stop at which passengers are to alight according to the count of passengers in the vehicle 20. The convenience for passengers or the operation efficiency of the vehicle 20 is thereby improved.

<Determination of Abnormality Response Pattern Based on Presence of Crew Member in Vehicle 20>

The information acquisition apparatus 26 of the vehicle 20 may detect whether a crew member is riding in the vehicle 20. Crew members may include the driver of the vehicle 20. Crew members may include cabin attendants such as a conductor who attends to passengers in the vehicle 20. Crew members may include workers who can respond to an abnormality occurring in the vehicle 20. The information acquisition apparatus 26 may output, to the DCM 40, information identifying whether a crew member is riding in the vehicle 20. The information identifying whether a crew member is riding in the vehicle 20 is also referred to as crew information. The DCM 40 may output the crew information to the operation management apparatus 10 as the second information. The controller 12 of the operation management apparatus 10 may acquire the crew information as the second information.

The controller 12 may differentiate between the abnormality response patterns determined as the operation pattern of the vehicle 20 for a case in which a crew member is riding in the vehicle 20 and a case in which a crew member is not riding in the autonomous vehicle. For example, even in a case in which the state of the vehicle 20 is [2] the state in which the vehicle 20 should return to the garage or [3] the state in which the vehicle 20 should make an emergency stop, the controller 12 may determine an abnormality response pattern for the crew member to confirm the state of the vehicle 20 in a case in which the crew member is riding in the vehicle 20. The controller 12 may determine the abnormality response pattern for the vehicle 20 to be able to continue running autonomously, or to be able to continue operating with operation by the crew member, after the crew member checks the vehicle 20.

As described above, the controller 12 may differentiate between abnormality response patterns for a case in which a crew member is riding in the vehicle 20 and a case in which no crew member is riding. In this way, the amount of work or the load for responding to abnormalities in autonomous vehicles can be reduced. Automation of the abnormality response can also be encouraged.

<Example Procedure for Operation Management Method>

The controller 12 of the operation management apparatus 10 may, for example, perform an operation management method including the procedures of the flowchart illustrated in FIG. 2 to generate route information indicating a route of a delivery vehicle or a stop position to a driver. The operation management method may be implemented as an operation management program to be executed by the controller 12. The operation management program may be stored on a non-transitory computer readable medium.

Figure 3:
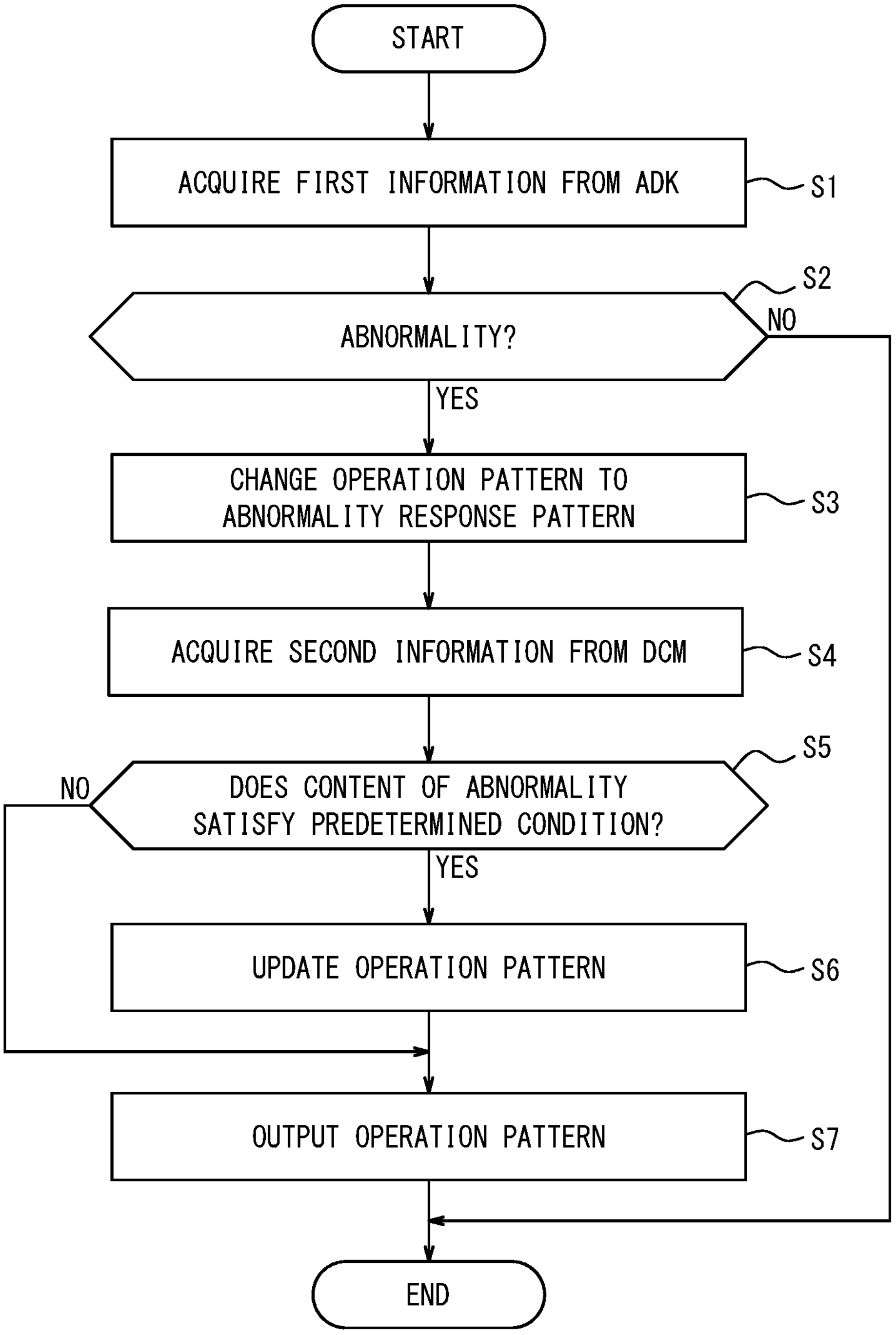
FIG. 3 is a flowchart illustrating an example of a procedure of an operation management method according to the embodiment.

The controller 12 acquires the first information from the ADK 30 (step S1). The controller 12 determines whether there is an abnormality in the vehicle 20 based on the first information (step S2). In a case in which it is determined that there is no abnormality in the vehicle 20 (step S2: NO), the controller 12 ends the procedure of the flowchart in FIG. 3. In this case, the vehicle 20 continues to operate with the operation pattern that has already been set. In a case in which it is determined that there is an abnormality in the vehicle 20 (step S2: YES), the controller 12 changes the operation pattern of the vehicle 20 to the abnormality response pattern determined based on the first information (step S3).

The controller 12 acquires the second information from the DCM 40 (step S4). The controller 12 determines whether the content of the abnormality in the vehicle 20 identified by the second information satisfies a predetermined condition (step S5). In a case in which the content of the abnormality satisfies the predetermined condition (step S5: YES), the controller 12 updates the operation pattern to the abnormality response pattern based on the content of the abnormality (step S6). In a case in which the content of the abnormality does not satisfy the predetermined condition (step S5: NO), the controller 12 proceeds to step S7 without updating the operation pattern. The controller 12 outputs either the operation pattern updated in the procedure of step S6 or the operation pattern changed in the procedure of step S3 to the ADK 30 (step S7). After performing the procedure of step S7, the controller 12 can end the execution of the procedures in the flowchart of FIG. 3.

Summary

As described above, the operation management apparatus 10 according to the present embodiment determines the abnormality response pattern based on the first information from the ADK 30 and determines whether the abnormality response pattern matches the content of the abnormality based on the second information from the DCM 40. The controller 12 updates the abnormality response pattern in a case in which the abnormality response pattern does not match the content of the abnormality. In this way, the amount of work or the load for responding to abnormalities in autonomous vehicles can be reduced. Automation of the abnormality response can be encouraged. Communication or the processing load can be reduced.

Furthermore, the operation management apparatus 10 can easily determine the abnormality response pattern by using the abnormality response matrix. As a result, the processing load can be reduced. The operation management apparatus 10 may also determine the abnormality response pattern according to the count of passengers in the vehicle 20. The convenience for passengers or the operation efficiency of the vehicle 20 is thereby improved. The operation management apparatus 10 also may differentiate between abnormality response patterns for a case in which a crew member is riding in the vehicle 20 and a case in which no crew member is riding. In this way, the amount of work or the load for responding to abnormalities in autonomous vehicles can be reduced. Automation of the abnormality response can be encouraged.

While an embodiment of the present disclosure has been described with reference to the drawings and examples, it is to be noted that various modifications and revisions may be implemented by those skilled in the art based on the present disclosure. Accordingly, such modifications and revisions are included within the scope of the present disclosure. For example, functions or the like included in each element, each step, or the like can be rearranged without logical inconsistency, and a plurality of elements, steps, or the like can be combined into one or divided.

The invention claimed is:

1. An operation management apparatus comprising a processor configured to:

acquire first information identifying an abnormality of an autonomous vehicle from an autonomous driving kit of the autonomous vehicle, the first information identifying one of the following four states: a first state in which the vehicle can run normally, a second state in which the vehicle can run but requires maintenance, a third state in which the vehicle should return to a garage, and a fourth state in which the vehicle should make an emergency stop;

acquire second information on the autonomous vehicle from an in-vehicle communication device of the autonomous vehicle, the second information is acquired when an abnormal state of the vehicle occurs;

determine an abnormality response pattern based on the first information;

identify a content of the abnormality based on the second information;

determine whether the abnormality response pattern matches the content of the abnormality;

upon determination that the abnormality response pattern matches the content of the abnormality, output the abnormality response pattern to the autonomous driving kit; and upon determination that the abnormality response pattern does not match the content of the abnormality, change the abnormality response pattern based on the second information and output the changed abnormality response pattern to the autonomous driving kit, wherein the first information does not specifically identify the content of the abnormality, and wherein the second information specifically identifies the content of the abnormality.

2. The operation management apparatus according to claim 1, wherein the processor is further configured to:

acquire, as the second information, the content of the abnormality that occurred in the autonomous vehicle; and update an operation pattern of the autonomous vehicle in a case in which the content of the abnormality satisfies a predetermined condition.

3. The operation management apparatus according to claim 1, wherein the processor is further configured to:

acquire, as the second information, a count of passengers riding in the autonomous vehicle; and differentiate, based on the count of passengers, between an abnormality response pattern for a case in which a passenger is riding in the autonomous vehicle and an abnormality response pattern for a case in which no passenger is riding in the autonomous vehicle.

4. The operation management apparatus according to claim 2, wherein the processor is further configured to:

acquire, as the second information, a count of passengers riding in the autonomous vehicle; and differentiate, based on the count of passengers, between an abnormality response pattern for a case in which a passenger is riding in the autonomous vehicle and an abnormality response pattern for a case in which no passenger is riding in the autonomous vehicle.

5. The operation management apparatus according to claim 1, wherein the processor is further configured to:

acquire, as the second information, crew information identifying whether a crew member is riding in the autonomous vehicle; and differentiate, based on the crew information, between abnormality response patterns as operation patterns for the autonomous vehicle for a case in which the crew member is riding in the autonomous vehicle and a case in which the crew member is not riding in the autonomous vehicle.

6. The operation management apparatus according to claim 2, wherein the processor is further configured to:

acquire, as the second information, crew information identifying whether a crew member is riding in the autonomous vehicle; and differentiate, based on the crew information, between abnormality response patterns as the operation patterns for the autonomous vehicle for a case in which the crew member is riding in the autonomous vehicle and a case in which the crew member is not riding in the autonomous vehicle.

7. The operation management apparatus according to claim 3, wherein the processor is further configured to:

acquire, as the second information, crew information identifying whether a crew member is riding in the autonomous vehicle; and differentiate, based on the crew information, between abnormality response patterns as operation patterns for the autonomous vehicle for a case in which the crew member is riding in the autonomous vehicle and a case in which the crew member is not riding in the autonomous vehicle.

8. The operation management apparatus according to claim 4, wherein the processor is further configured to:

acquire, as the second information, crew information identifying whether a crew member is riding in the autonomous vehicle; and differentiate, based on the crew information, between abnormality response patterns as the operation patterns for the autonomous vehicle for a case in which the crew member is riding in the autonomous vehicle and a case in which the crew member is not riding in the autonomous vehicle.

9. The operation management apparatus according to claim 1, wherein the processor is further configured to, based on an abnormality response matrix in which the abnormality response pattern and the abnormality identified by the first information are associated, change an operation pattern of the autonomous vehicle to the abnormality response pattern corresponding to the abnormality.

10. The operation management apparatus according to claim 2, wherein the processor is further configured to, based on an abnormality response matrix in which the abnormality response pattern and the abnormality identified by the first information are associated, change an operation pattern of the autonomous vehicle to the abnormality response pattern corresponding to the abnormality.

11. The operation management apparatus according to claim 3, wherein the processor is further configured to, based on an abnormality response matrix in which the abnormality response pattern and the abnormality identified by the first information are associated, change an operation pattern of the autonomous vehicle to the abnormality response pattern corresponding to the abnormality.

12. The operation management apparatus according to claim 4, wherein the processor is further configured to, based on an abnormality response matrix in which the abnormality response pattern and the abnormality identified by the first information are associated, change the operation pattern of the autonomous vehicle to the abnormality response pattern corresponding to the abnormality.

13. The operation management apparatus according to claim 5, wherein the processor is further configured to, based on an abnormality response matrix in which the abnormality response pattern and the abnormality identified by the first information are associated, change the operation pattern of the autonomous vehicle to the abnormality response pattern corresponding to the abnormality.

14. The operation management apparatus according to claim 6, wherein based on an abnormality response matrix in which the abnormality response pattern and the abnormality identified by the first information are associated, the processor is configured to change the operation pattern of the autonomous vehicle to the abnormality response pattern corresponding to the abnormality.

15. The operation management apparatus according to claim 7, wherein the processor is further configured to, based on an abnormality response matrix in which the abnormality response pattern and the abnormality identified by the first information are associated, change the operation pattern of the autonomous vehicle to the abnormality response pattern corresponding to the abnormality.

16. The operation management apparatus according to claim 8, wherein the processor is further configured to, based on an abnormality response matrix in which the abnormality response pattern and the abnormality identified by the first information are associated, change the operation pattern of the autonomous vehicle to the abnormality response pattern corresponding to the abnormality.

* * * * *